United States Patent
Tseng (10) Patent No.: US 9,753,609 B2
(45) Date of Patent: Sep. 5, 2017

(54) USER INTERFACE WITH MEDIA WHEEL FACILITATING VIEWING OF MEDIA OBJECTS

(75) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 398 days.

(21) Appl. No.: 12/959,576

(22) Filed: Dec. 3, 2010

(65) Prior Publication Data

US 2012/0144343 A1    Jun. 7, 2012

(51) Int. Cl.
*G06F 3/048*    (2013.01)
*G06F 3/0482*   (2013.01)

(52) U.S. Cl.
CPC ................... *G06F 3/0482* (2013.01)

(58) Field of Classification Search
CPC ....................................... G06F 3/0482
USPC ........................................... 715/784
See application file for complete search history.

(56) References Cited

U.S. PATENT DOCUMENTS

| | | | | |
|---|---|---|---|---|
| 5,740,549 A * | 4/1998 | Reilly | ................. | G06Q 30/0243 705/14.42 |
| 6,029,195 A * | 2/2000 | Herz | .............................. | 725/116 |
| 7,072,896 B2 * | 7/2006 | Lee et al. | | |
| 7,117,453 B2 * | 10/2006 | Drucker et al. | .............. | 715/833 |
| 7,131,059 B2 * | 10/2006 | Obrador | ......................... | 715/209 |
| 7,149,755 B2 * | 12/2006 | Obrador | | |
| 7,185,049 B1 * | 2/2007 | Benitez et al. | ............... | 709/203 |
| 7,234,117 B2 * | 6/2007 | Zaner et al. | ................... | 715/758 |
| 7,269,590 B2 * | 9/2007 | Hull et al. | ..................... | 707/770 |
| 7,593,740 B2 * | 9/2009 | Crowley et al. | ............ | 455/456.3 |
| 7,610,051 B2 * | 10/2009 | Dunko et al. | ................ | 455/456.1 |
| 7,669,123 B2 * | 2/2010 | Zuckerberg et al. | .......... | 715/273 |
| 7,702,675 B1 * | 4/2010 | Khosla et al. | ................ | 707/710 |
| 7,702,728 B2 * | 4/2010 | Zaner et al. | ................... | 709/205 |
| 7,707,198 B2 * | 4/2010 | Weber | ............... | G06F 17/30864 707/705 |
| 7,734,622 B1 * | 6/2010 | Fitzhugh | ........... | G06F 17/30038 707/722 |
| 7,797,643 B1 * | 9/2010 | Jobs et al. | ..................... | 715/815 |
| 7,810,043 B2 * | 10/2010 | Ostojic et al. | ................ | 715/784 |
| 7,856,360 B2 * | 12/2010 | Kramer et al. | ................. | 705/1.1 |
| 7,865,927 B2 * | 1/2011 | Brodersen et al. | ........... | 725/109 |
| 7,900,131 B2 * | 3/2011 | Kahn et al. | .................... | 715/205 |
| 7,913,277 B1 * | 3/2011 | Rahrer | .......................... | 725/36 |
| 7,917,154 B2 * | 3/2011 | Fortescue et al. | ......... | 455/456.1 |
| 7,921,134 B2 * | 4/2011 | Morris et al. | ................. | 707/802 |
| 7,937,336 B1 * | 5/2011 | Maynard-Zhang et al. | .... | 706/12 |
| 7,979,803 B2 * | 7/2011 | Kim et al. | ..................... | 715/762 |
| 8,005,906 B2 * | 8/2011 | Hayashi et al. | .............. | 709/206 |
| 8,032,651 B2 * | 10/2011 | Miner et al. | ................... | 709/231 |
| 8,055,688 B2 * | 11/2011 | Giblin | .......................... | 707/804 |
| 8,060,830 B2 * | 11/2011 | Kahn et al. | .................... | 715/760 |
| 8,108,341 B2 * | 1/2012 | Barsook et al. | .............. | 707/618 |
| 8,112,514 B2 * | 2/2012 | Blencowe | ..................... | 709/224 |
| 8,117,564 B2 * | 2/2012 | Woods et al. | ................. | 715/850 |

(Continued)

OTHER PUBLICATIONS (How to Use Facebook Places by Miller dated Aug. 20, 2010; last accessed Oct. 10, 2014; http://www.pcworld.com/article/203819/how_to_use_facebook_places.html.*

*Primary Examiner* — Jung-Mu Chuang
(74) *Attorney, Agent, or Firm* — Baker Botts L.L.P.

(57) ABSTRACT

A mechanism directed to extracting and displaying media content of a news feed or other structured document in a scrollable media wheel frame.

15 Claims, 7 Drawing Sheets

(56) References Cited

U.S. PATENT DOCUMENTS

| | | | |
|---|---|---|---|
| 8,161,418 B2* | 4/2012 | Sodhi et al. | 715/867 |
| 8,181,110 B2* | 5/2012 | Worthington | 715/716 |
| 8,196,043 B2* | 6/2012 | Crow et al. | 715/716 |
| 8,280,843 B2* | 10/2012 | von Koch et al. | 707/607 |
| 8,290,513 B2* | 10/2012 | Forstall et al. | 455/456.3 |
| 8,302,008 B2* | 10/2012 | Hertenstein | G06F 17/30896 715/704 |
| 8,332,392 B2* | 12/2012 | Brzozowski et al. | 707/722 |
| 8,352,859 B2* | 1/2013 | Zuckerberg et al. | 715/273 |
| 8,392,500 B2* | 3/2013 | Macwan | 709/203 |
| 8,402,094 B2* | 3/2013 | Bosworth et al. | 709/206 |
| 8,442,969 B2* | 5/2013 | Gross | 707/709 |
| 8,521,824 B2* | 8/2013 | Baransky et al. | 709/206 |
| 8,793,341 B2* | 7/2014 | Cheng et al. | 709/219 |
| 8,825,759 B1* | 9/2014 | Jackson et al. | 709/204 |
| 8,875,181 B2* | 10/2014 | Meuninck et al. | 725/40 |
| 8,935,339 B2* | 1/2015 | Cheng et al. | 709/206 |
| 2001/0044809 A1* | 11/2001 | Parasnis et al. | 707/513 |
| 2002/0108115 A1* | 8/2002 | Palmer | 725/50 |
| 2003/0174861 A1* | 9/2003 | Levy et al. | 382/100 |
| 2003/0191776 A1* | 10/2003 | Obrador | 707/104.1 |
| 2004/0041836 A1* | 3/2004 | Zaner et al. | 345/751 |
| 2004/0064500 A1* | 4/2004 | Kolar et al. | 709/202 |
| 2004/0143598 A1* | 7/2004 | Drucker et al. | 707/104.1 |
| 2005/0115816 A1* | 6/2005 | Gelfond | G06F 3/0362 200/339 |
| 2005/0177385 A1* | 8/2005 | Hull | G06Q 10/10 705/319 |
| 2005/0289468 A1* | 12/2005 | Kahn et al. | 715/738 |
| 2006/0004914 A1* | 1/2006 | Kelly et al. | 709/219 |
| 2006/0161599 A1* | 7/2006 | Rosen | 707/201 |
| 2006/0258368 A1* | 11/2006 | Granito et al. | 455/456.1 |
| 2006/0270419 A1* | 11/2006 | Crowley et al. | 455/456.2 |
| 2006/0271560 A1* | 11/2006 | Mitchell | 707/10 |
| 2007/0074096 A1* | 3/2007 | Lee | G06F 17/30056 715/210 |
| 2007/0097929 A1* | 5/2007 | Dunko et al. | 370/338 |
| 2007/0162228 A1* | 7/2007 | Mitchell | 701/213 |
| 2007/0247755 A1* | 10/2007 | Han | G06F 1/1626 360/128 |
| 2007/0281689 A1* | 12/2007 | Altman et al. | 455/435.1 |
| 2007/0282678 A1* | 12/2007 | Dendi et al. | 705/14 |
| 2008/0040474 A1* | 2/2008 | Zuckerberg et al. | 709/224 |
| 2008/0040673 A1* | 2/2008 | Zuckerberg et al. | 715/745 |
| 2008/0070593 A1* | 3/2008 | Altman et al. | 455/457 |
| 2008/0102856 A1* | 5/2008 | Fortescue et al. | 455/456.1 |
| 2008/0134030 A1* | 6/2008 | Kansal et al. | 715/700 |
| 2008/0140712 A1* | 6/2008 | Weber | G06F 17/30899 |
| 2008/0154951 A1* | 6/2008 | Martinez et al. | 707/103 Y |
| 2008/0209351 A1* | 8/2008 | Macadaan et al. | 715/762 |
| 2009/0005076 A1* | 1/2009 | Forstall et al. | 455/456.2 |
| 2009/0113301 A1* | 4/2009 | Fisher et al. | 715/716 |
| 2009/0119167 A1* | 5/2009 | Kendall et al. | 705/14 |
| 2009/0153389 A1* | 6/2009 | Kerr et al. | 341/176 |
| 2009/0244003 A1* | 10/2009 | Bonnat | 345/157 |
| 2010/0017502 A1* | 1/2010 | Cheng et al. | 709/219 |
| 2010/0037274 A1* | 2/2010 | Meuninck et al. | 725/109 |
| 2010/0107051 A1* | 4/2010 | Hertenstein | G06F 17/30896 715/234 |
| 2010/0153831 A1* | 6/2010 | Beaton | G06Q 30/02 715/201 |
| 2010/0161826 A1* | 6/2010 | Miner et al. | 709/231 |
| 2010/0182341 A1* | 7/2010 | Lee | G06F 17/30044 345/635 |
| 2010/0205563 A1* | 8/2010 | Haapsaari et al. | 715/825 |
| 2010/0211872 A1* | 8/2010 | Rolston et al. | 715/702 |
| 2010/0235765 A1* | 9/2010 | Worthington | 715/760 |
| 2010/0257460 A1* | 10/2010 | Zaner et al. | 715/753 |
| 2011/0029538 A1* | 2/2011 | Harple, Jr. et al. | 707/741 |
| 2011/0087970 A1* | 4/2011 | Swink et al. | 715/752 |
| 2011/0106896 A1* | 5/2011 | Baransky et al. | 709/206 |
| 2011/0154223 A1* | 6/2011 | Whitnah et al. | 715/753 |
| 2011/0277039 A1* | 11/2011 | Harris et al. | 726/28 |
| 2012/0005203 A1* | 1/2012 | Brzozowski et al. | 707/732 |
| 2012/0036455 A1* | 2/2012 | Holt et al. | 715/753 |
| 2012/0072428 A1* | 3/2012 | Kao et al. | 707/748 |
| 2012/0077521 A1* | 3/2012 | Boldyrev et al. | 455/456.3 |
| 2012/0079429 A1* | 3/2012 | Stathacopoulos | G06F 17/30979 715/830 |
| 2012/0102153 A1* | 4/2012 | Kemp et al. | 709/219 |
| 2012/0102402 A1* | 4/2012 | Kwong | 715/705 |
| 2012/0102420 A1* | 4/2012 | Fukahori | 715/771 |
| 2012/0144343 A1* | 6/2012 | Tseng | G06F 3/0482 715/834 |
| 2012/0150772 A1* | 6/2012 | Paek et al. | 706/12 |
| 2014/0143004 A1* | 5/2014 | Abhyanker | 705/7.19 |
| 2014/0230030 A1* | 8/2014 | Abhyanker | 726/6 |
| 2015/0370808 A1* | 12/2015 | Olstad | G06F 17/30796 707/722 |

\* cited by examiner

USER INTERFACE WITH MEDIA WHEEL FACILITATING VIEWING OF MEDIA OBJECTS

TECHNICAL FIELD

The present disclosure relates generally to graphical user interfaces and, more particularly, to displaying media content of a news feed in a scrollable media wheel frame.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationships with other users in the social networking system (e.g., social graph), as well as provide services (e.g., wall-posts, photo-sharing, or instant messaging) to facilitate social interaction between users in the social networking system.

SUMMARY

Particular embodiments relate to extracting and displaying media content of a news feed or other structured document in a scrollable media wheel frame. These and other features, aspects, and advantages of the disclosure are described in more detail below in the detailed description and in conjunction with the following figures.

DETAILED DESCRIPTION

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts.

A social network system may maintain social graph information, which can be generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the invent and other users invited to the event. The invited users may receive invitations to the event and respond (such as by accepting the invitation or declining it). Furthermore, social networking system may allow users to maintain a personal calendar. Similarly to events, the calendar entries may include times and dates, locations and identities of other users.

A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user. The privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

A social networking system may support a news feed service. A news feed is a data format typically used for providing users with frequently updated content. A social networking system may provide various news feeds to its users, where each news feed includes content relating to a specific subject matter or topic, and/or other users. Various pieces of content may be aggregated into a single news feed. In some implementations, a social networking system may provide a news feed that includes selected entries corresponding to activities of a user's first-degree contacts and/or pages or topics that a user has indicated an interest. Individual users of the social networking system may subscribe to specific news feeds of their interest. U.S. Pat. No. 7,669,123, incorporated by reference in its entirety for all purposes, describes a system that can be used to dynamically provide a news feed. A group of related actions may be presented together to a user of the social networking system in the same news feed. For example, a news feed concerning the event organized through the social networking system may include information about the event, such as its time, location, and attendees, and photos taken at the event, which have been uploaded to the social networking system. U.S. application Ser. No. 12/884,010, incorporated by reference in its entirety for all purposes, describes a system that can be used to construct a news feed comprising related actions and present the news feed to a user of the social networking system.

Social networking system may maintain a database of information relating to places. Places correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including the comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,718, incorporated by reference in its entirety for all purposes, describes an example geo-social networking system that can be used in connection with various embodiments of the present invention.

Figure 1:
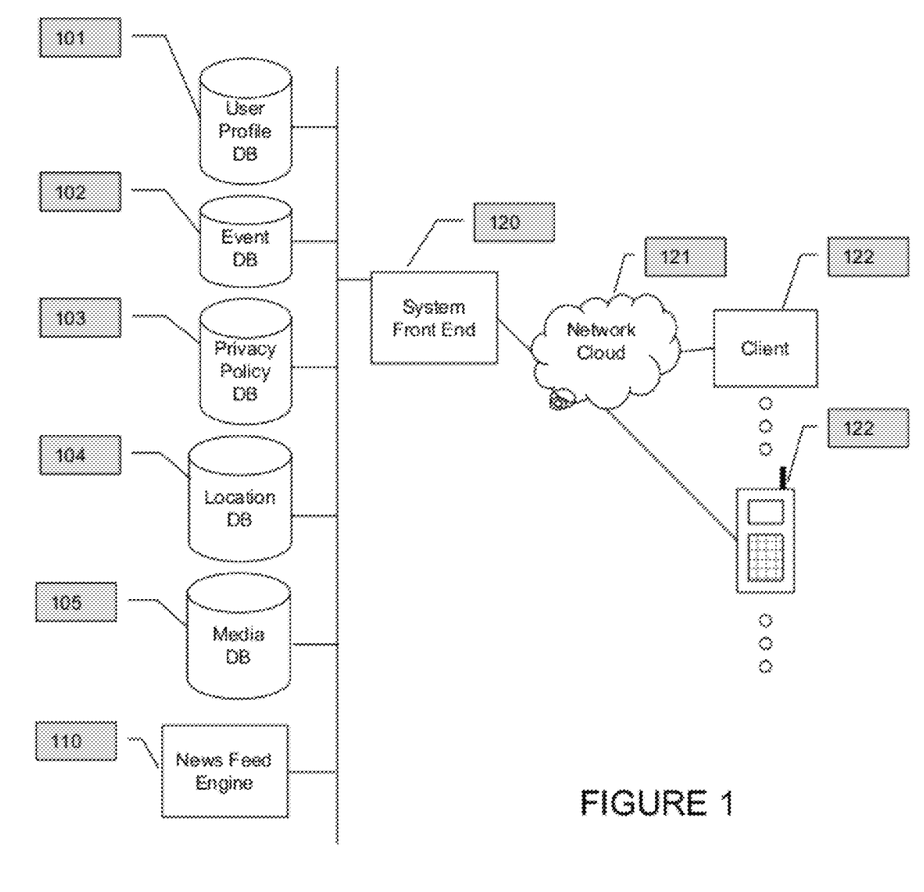
FIG. 1 illustrates an example social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, databases 101, 102, 103, 104, and 105 may be operably connected to the social networking system's front end 120 and news feed engine 110. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, a user of the social networking system may upload one or more media files to media database 105. For example, a user can upload a photo or a set of photos (often called a photo album), or a video clip to media database 105 from a client device 122 (e.g., a computer, or a camera phone). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates. A user can add additional metadata values to a photo, or tag a photo, during an upload process. Some examples of tags of a media file are author, title, comments, event names, time, location, names of people appearing in the media file, or user comment. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. In particular embodiments, the social networking system may also extract metadata from a media file and store the metadata in media database 105.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. In particular embodiments, location database 104 may store geo-location data identifying a real-world geographic location of an object, such as a mobile device. For example, a geographic location of an Internet connected computer can be identified by the computer's IP address. For example, a geographic location of a cell phone equipped with Wi-Fi and GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, a geographic location of a place with a large area (e.g., Yosemite National Park) can be a shape (e.g., a circle, or a polygon) approximating the boundary of the place and/or a centroid of the shape. For example, additional information of a place can be business hours, photos, or user reviews of the place. In particular embodiments, location database 104 may store a user's location data. For example, location database 104 may store a user's check-in activities. For example, a user can create a place (e.g., a new restaurant or coffee shop) and the social networking system can store the created place in location database 104. For example, location database 104 can store a user's search activity.

In particular embodiments, news feed engine 110 may access user profile database 101, event database 102, location database 104 and media database 105 for data about a particular user of the social networking system, and assemble a list of one or more activities as news items for a particular user. In particular embodiments, news feed engine 110 may access privacy policy database 103 and determines a subset of news items based on one or more privacy settings. In particular embodiments, news feed engine 110 may compile a dynamic list of a limited number of news items in a ranked or sorted order. In particular embodiments, news feed engine 110 may provide links related to one or more activities in the news items, and links providing opportunities to participate in the activities. For example, a news feed can comprise wall posts, status updates, recently uploaded photos, comments, and recent check-ins to a place (with a link to a web page of the place).

In other embodiments, news feed engine 110 may access user profile database 101, event database 102, location database 104 and media database 105 and compile a dynamic list of a limited number of news items about a group of related actions received from users of the social networking system (i.e., a news feed). For example, a news feed can comprise an event that a user may schedule and organize through the social networking system (with a link to participate the event), check-ins at a specific geographical location of the event by the user and other participants of the event, messages about the event posted by the user and other participants of the event, and photos of the event uploaded by the user and other participants of the event.

In particular embodiments, news feed engine 100 may access user profile database 101 and determine a first user's first-degree friends (i.e., users who are one degree from the first user), generate a mini-feed for each of the first-degree friends, compile a news feed based on the mini-feeds of the first-degree friends, and present the news feed to the first user.

As a news feed's media content (e.g., photos, albums, video clips) is often viewed in a limited-sized display (e.g., a screen of a mobile phone), it is desirable to display media content of a news feed in a compact, organized, and easily accessible format. Particular embodiments herein describe methods of displaying media content of a news feed in a media wheel frame.

A news feed can be delivered as a structured document, such as a HyperText Markup Language (HTML) document, an eXtensible Markup Language (XML) document, or any other document format with structural semantics, Standard Generalized Markup Language (SGML), Portable Document Format (PDF), and the like. A browser or other client application can process this structured document and render it in a graphical user interface. Typically, to render a structured document the browser hosted on a remote device accesses one or more resources provided at one or more backend servers of an associated website. A structured document, which may itself include multiple embedded resources, may include data records, such as content plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and, frequently, Java. By way of example, HTML enables a developer to create a structured document by denoting structural semantics for text and links, as well as images, web applications and other objects that can be embedded within a structured document. Generally, a structured document may be delivered to a client as a static document, however, through the use of web elements embedded in the structured document, an interactive experience may be achieved with the page or a sequence of pages. During a user session, the browser processes and displays the structured documents and associated resources received or retrieved from the website hosting the underlying structured document, as well as, potentially, resources from other websites.

Typically, a web browser used to access a webpage (or other structured document) for rendering at a client device, obtains the required resources (e.g., in response to executing JavaScripts or other calls embedded in a requested and received structured document and which may include HTML or XML code and/or JavaScript scripts and/or content including text, audio, and video) for rendering the document from one or more servers and then constructs a browser representation of the document. In particular embodiments, the browser representation may be a Document Object Model (DOM) representation of the document. The browser then renders the page in the particular client viewing window of the browser utilizing the DOM (or other suitable) representation. A DOM representation of a structured document defines the logical structure of the document as well as the way the document is accessed and manipulated. The structure of a DOM representation is generally based on an object structure that closely resembles the logical structure of the document (e.g., webpage) it models. In addition, scripts and other code objects can cause changes to the DOM representation of a structured document, causing corresponding changes to the rendered content.

A news feed may be implemented using Really Simple Syndication (RSS) and/or other protocol formats. Each news feed item can be embedded in an underlying structured document. A news feed item itself may include one or more of a title or heading, text, comments, hypertext links, and/or in-line (src) references to embedded multimedia objects (such as images, video or audio). Multimedia content typically are included in structured documents with associated HTML or other elements or tags. In HTML for example, an image is typically included in a document by using an <img> element with a src attribute set to a uniform resource locator corresponding to the image. The news feed items are typically arranged in a list format. To view each news item, a user typically scrolls through the document to view various news items and their associated content, such as images.

Figure 2:
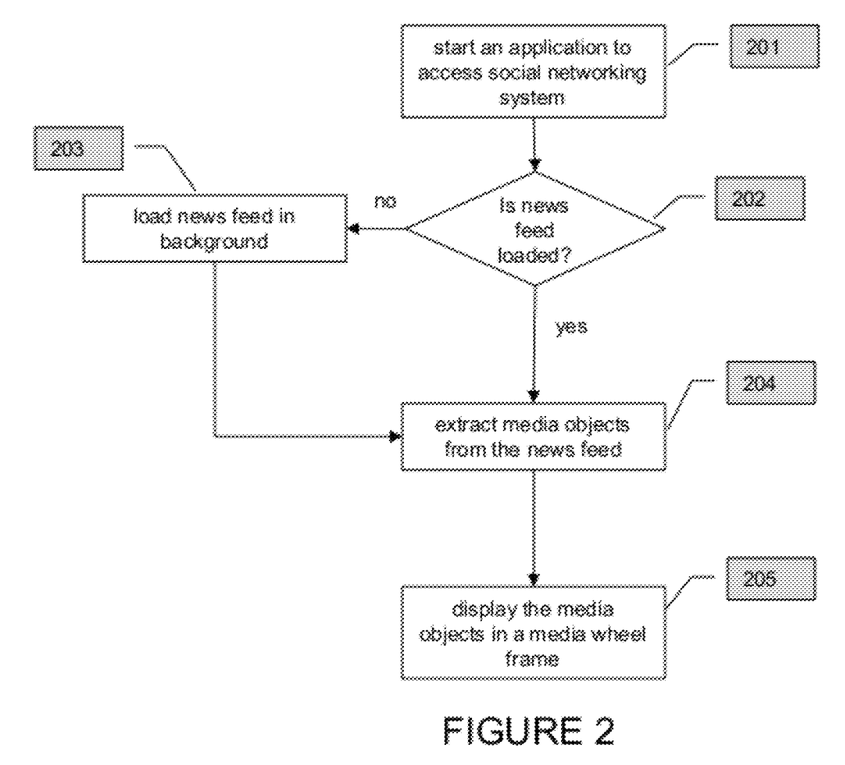
FIG. 2 illustrates an example method of displaying media content of a news feed.

FIG. 2 illustrates an example method of extracting multimedia content of a news feed or other structured document, and displaying it in connection with the news feed in a manner that facilitates user navigation, especially for client devices having smaller displays. FIG. 2 can be implemented by a media content displaying process hosted by a computing device. In particular embodiments, a user of the social networking system may start an application hosted by the user's client device 122 to access the social networking system (201). The media content displaying process, in response to an event (e.g., initiation of an application, the refreshing or request for new data or otherwise) determines whether a structured document including a news feed has been loaded into the application (202). For example, a user can enter an URL for the social networking system in a web browser, or start a special-purpose client application (e.g., Facebook on iPhone) to access the social networking system, and the media content displaying process can determine whether a structured document including a news feed has been loaded. In particular embodiments, if the news feed for the user has not been loaded, the media content displaying process may load the news feed into the application in the background (203).

In particular embodiments, the media content displaying process may extract media objects from the news feed document (204). For example, the user can access the social networking system on the user's mobile phone, causing the media content displaying process to extract photos and video clips from the news feed. In one implementation, the media content displaying process may scan each news feed item for particular attributes, such as <img> to locate and/or retrieve the media elements of the news feed. In particular embodiments, the media content displaying process displays the media objects extracted from the news feed in a separate media wheel frame (205). For example, media content displaying process may use the values of the src attributes to retrieve the media content and add them to the media wheel frame. The media wheel frame allows a user to view and quickly scroll the multimedia content extracted from the news feed without any intervening text or other elements of the underlying structured document. In some implementations, the images and other content may include in-line links that, when clicked, cause the client application to navigate to the corresponding news feed item from which the content was extracted.

In some embodiments, the media content displaying process may construct the media wheel frame in a structured document or as part of the structured document containing the news feed. In other implementations, the media wheel frame may be implemented by a separate application or a plug-in to an existing application. In some implementations, the process described above may be implemented as a Javascript object embedded in the structured document itself. In yet other implementations, the process described above can be implemented at a server remote from the client device. In particular embodiments, the media content displaying process may place the media wheel frame overlaying the application's user interface. In particular embodiments, the media content displaying process may place the media wheel frame adjacent to or in the vicinity of the application's user interface. In particular embodiments, the media content displaying process may store the media objects extracted from the news feed in a local storage of the user's client device 122. For example, the media content displaying process can store the extracted photos, photo albums and video clips in a microSD card of the user's mobile phone. In particular embodiments, the media content displaying process may periodically update the extracted media objects stored in a local storage of the user's client device 122.

Figure 3:
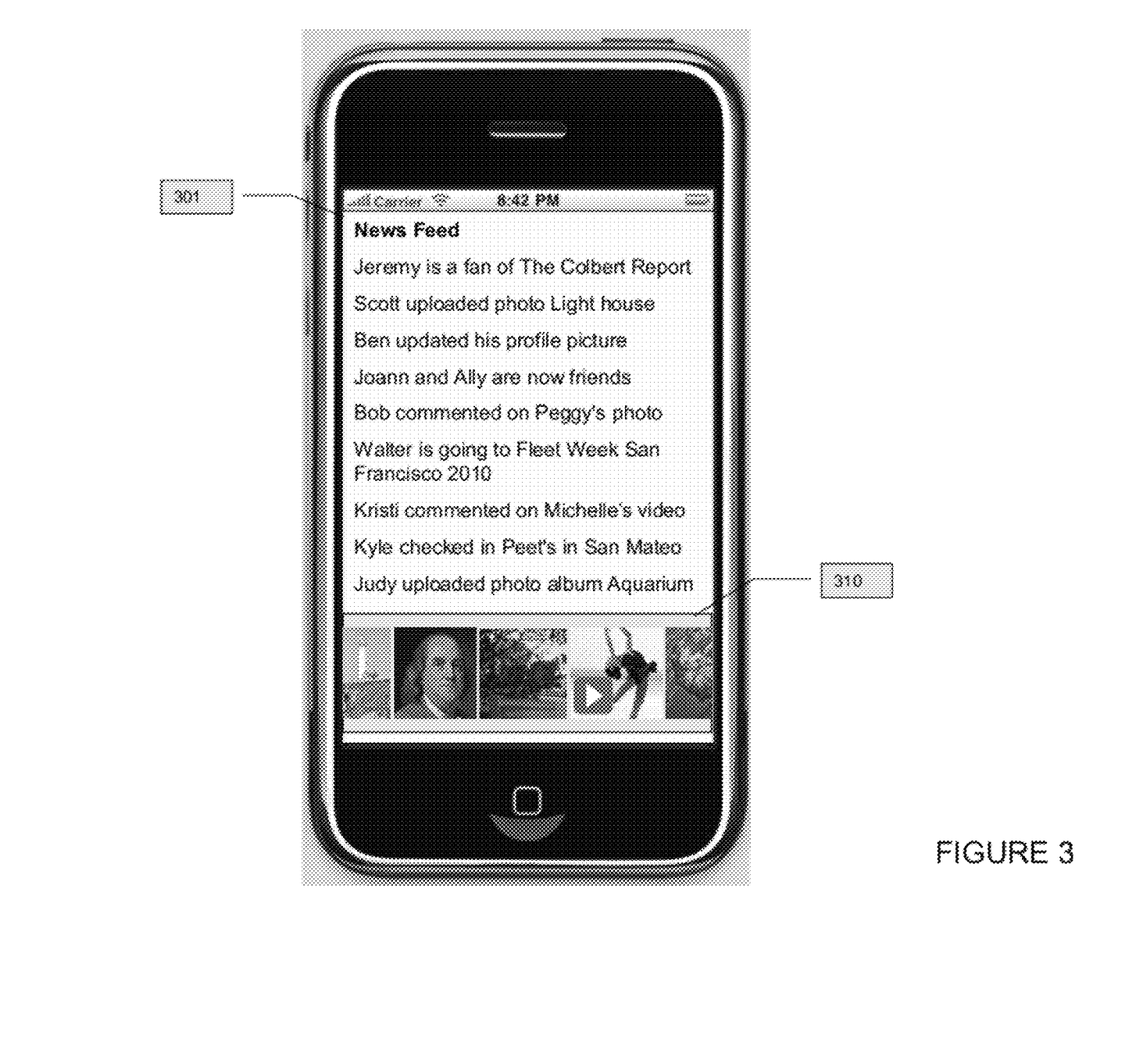
FIG. 3 illustrates an example media wheel frame displaying media objects of a news feed.

FIG. 3 illustrates an example media wheel frame displaying media objects extracted from a news feed. An application accessing the social networking system can display a news feed 301, and place a media wheel frame 310 displaying media objects from the news feed (e.g., a photo, a cover photo of a photo album, a still frame of a video clip) along side with the news feed. In particular embodiments, the media wheel frame may display a portion or all of media objects of a news feed. In some implementations, the media content displaying process extracts the content and changes the underlying HTLM or other code of the news feed document to omit the extracted content from the news feed item, as shown in FIG. 3. In other implementations, the media content displaying process leaves the content and news feed item code intact, causing the content to be displayed both in connection with the news feed item and the media wheel frame 310. Furthermore, while the Figures illustrate the media wheel frame 310 being adjacent to the rendered news feed 301, other implementations are possible. For example, an application may allow a user to toggle between a news feed and a media wheel frame, where both views consume the entire display region of the client device 122.

Figure 3A:
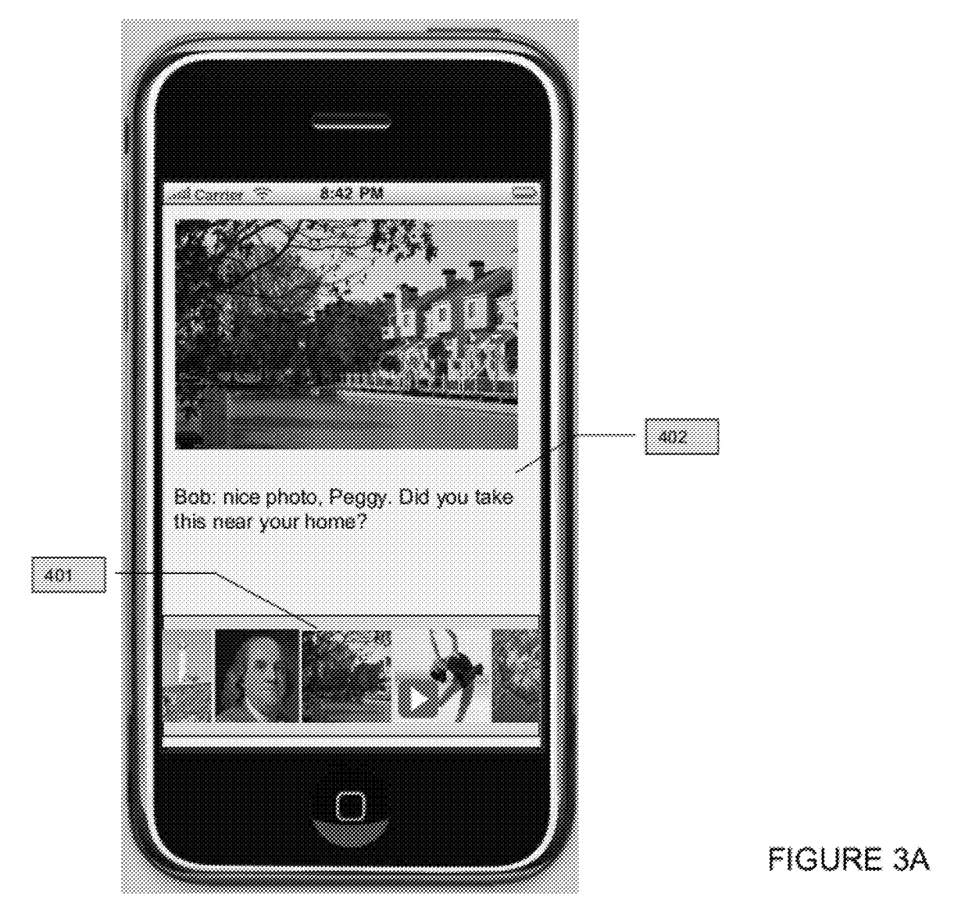
FIG. 3A illustrates an example of selecting and displaying a photo from a media wheel frame.

In particular embodiments, the media wheel frame may be scrollable. For example, a user can scroll through photos in the media wheel frame by a swiping motion by a finger or a curser, or by selecting an icon (e.g., a left arrow and/or a right arrow) indicating one or more photos are available. In particular embodiments, each of the one or more media objects in the media wheel frame may be selectable. For example, a user can select a photo in the media wheel frame by finger tapping or mouse clicking, cause the media content displaying process to display the photo in larger size, or display the photo and the comments associated with the photo. For example, a user can select a still frame of a video clip in the media wheel frame, causing the media content displaying process to play the video clip. For example, a user can select a cover photo of a photo album, causing the media content displaying process to display the photo album. FIG. 3A illustrates an example of selecting and displaying a photo from a media wheel frame. In the example of FIG. 3A, a user selects a photo (401) in a media wheel frame, and the media objects displaying process displays the photo and a comment associated with the photo (402).

Although the implementations described above operate in connection with a news feed, embodiments of the invention can also be applied to other structured documents that include a media objects. For example, the extraction and display functions discussed above can be used in connection with user profile pages, places pages in a geo-social network system, or any other structured document. For example, in particular embodiments, the social networking system may access user profile database 101, event database 102, location database 104 and media database 105 for data about a particular user in response to a request for a profile page. A media content displaying process, hosted client or server side, may assemble a list of one or more media objects related the particular user (e.g., photos and video clips uploaded to media database 105 by the particular user or the particular user's first-degree friends, photos uploaded to media database 105 by users of the social networking system for an event that the particular user attended recently, photos that the particular user was tagged to recently) and assemble the media wheel display frame either as part of a page generating process (server side) or upon download of the profile page (client side).

Figure 5:
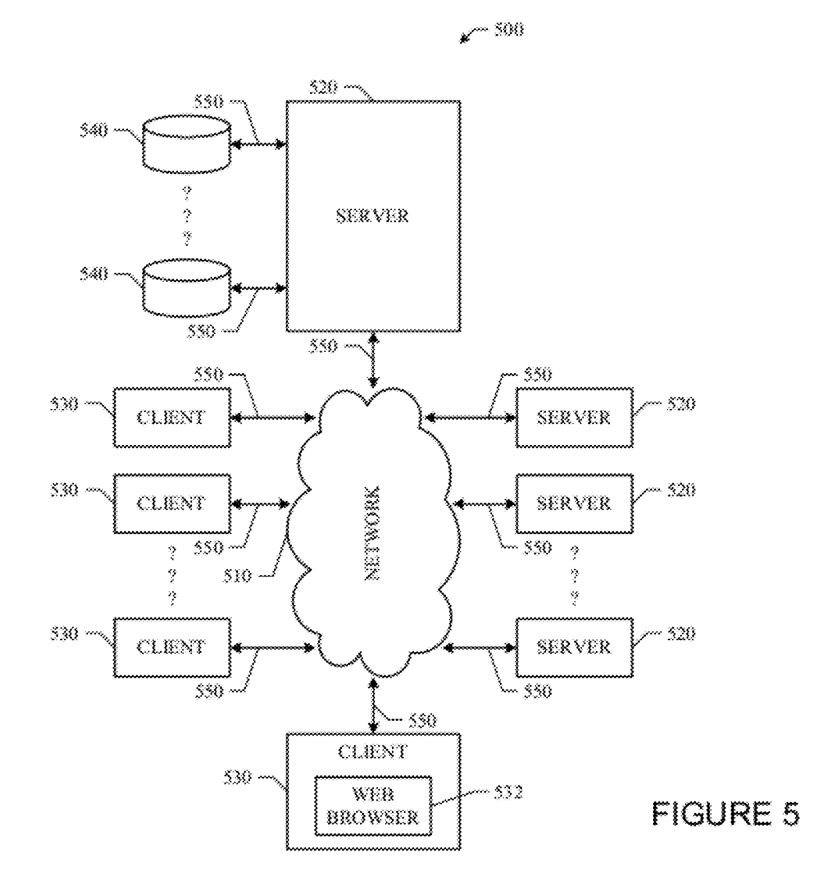
FIG. 5 illustrates an example network environment.

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
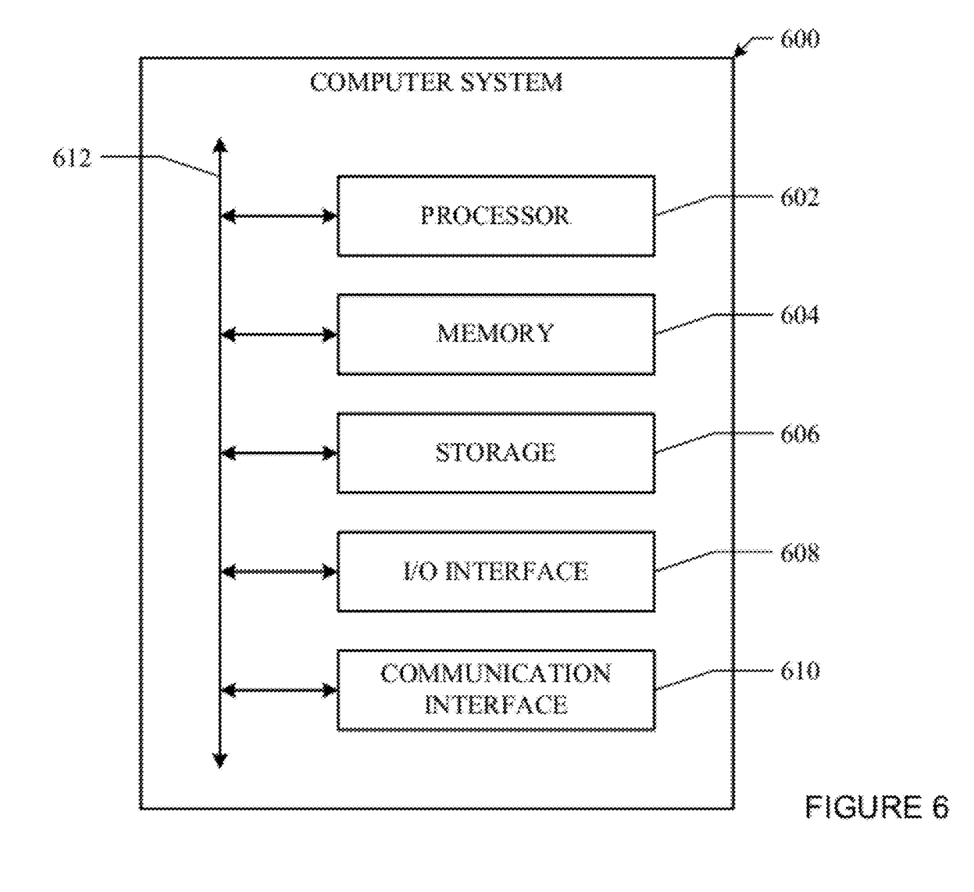
FIG. 6 illustrates an example computer system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 602, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 602, or storage 606; decode and execute them; and then write one or more results to an internal register, an internal cache, memory 602, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 602 or storage 606, and the instruction caches may speed up retrieval of those instructions by processor 602. Data in the data caches may be copies of data in memory 602 or storage 606 for instructions executing at processor 602 to operate on; the results of previous instructions executed at processor 602 for access by subsequent instructions executing at processor 602 or for writing to memory 602 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 602 includes main memory for storing instructions for processor 602 to execute or data for processor 602 to operate on. As an example and not by way of limitation, computer system 600 may load instructions from storage 606 or another source (such as, for example, another computer system 600) to memory 602. Processor 602 may then load the instructions from memory 602 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 602. In particular embodiments, processor 602 executes only instructions in one or more internal registers or internal caches or in memory 602 (as opposed to storage 606 or elsewhere) and operates only on data in one or more internal registers or internal caches or in memory 602 (as opposed to storage 606 or elsewhere). One or more memory buses (which may each include an address bus and a data bus) may couple processor 602 to memory 602. Bus 612 may include one or more memory buses, as described below. In particular embodiments, one or more memory management units (MMUs) reside between processor 602 and memory 602 and facilitate accesses to memory 602 requested by processor 602. In particular embodiments, memory 602 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 602 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Figure 4:
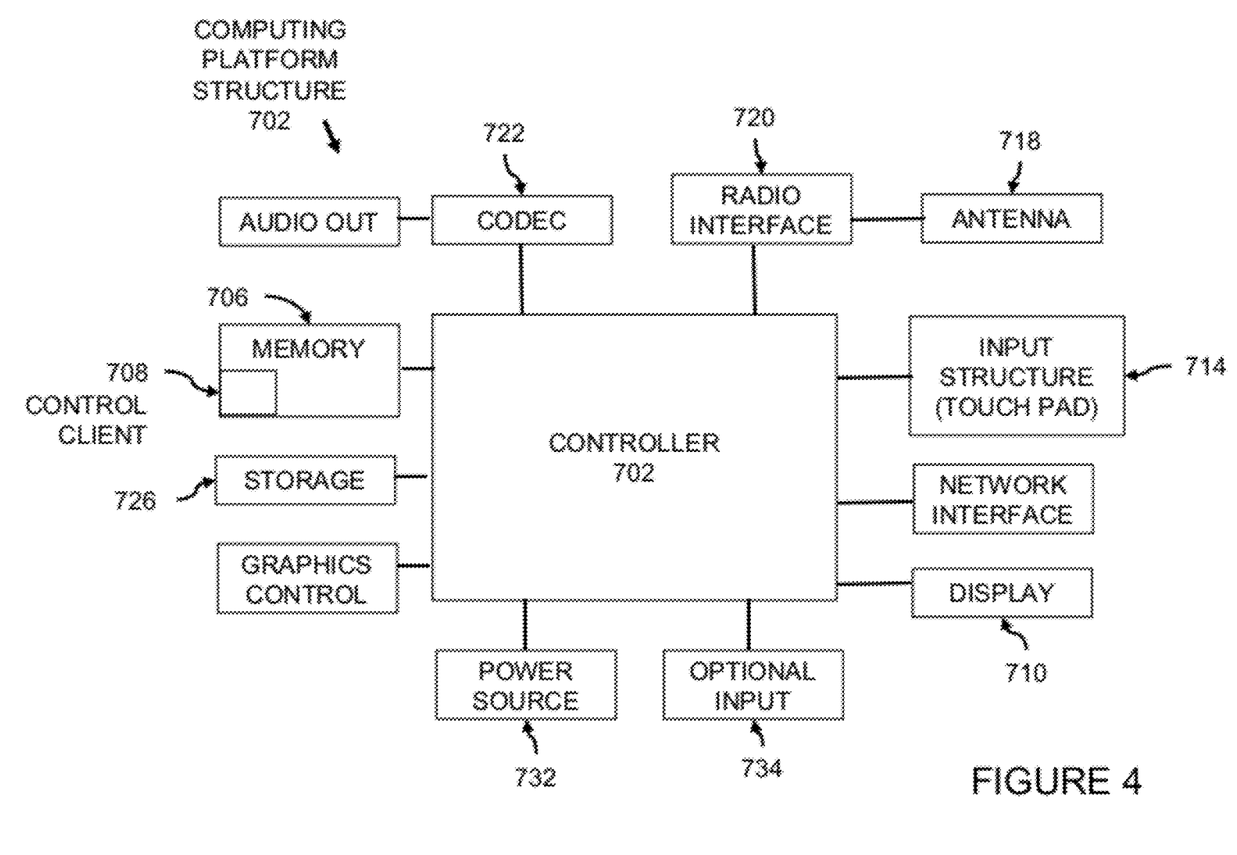
FIG. 4 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 4 shows a schematic representation of the main components of an example computing platform 702, according to various particular embodiments. Multipoint sensing devices generally include a controller 704 which may comprise a microcontroller or one or more processors configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code (including control client 708 described below) and/or data may be physically stored within a memory block 706 that is operatively coupled to controller 704.

Memory block 706 encompasses one or more storage media and generally provides a place to store computer code (e.g., software and/or firmware) and data that are used by the computing platform 702. By way of example, memory block 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory block 706 may also include one or more fixed storage devices in the form of, by way of example, solid-state hard disk drives (HDDs), among other suitable forms of memory coupled bi-directionally to controller 704. Information may also reside on a removable storage medium loaded into or installed in multipoint sensing devices when needed. By way of example, any of a number of suitable memory cards may be loaded into computing platform 702 on a temporary or permanent basis.

Controller 704 is also generally coupled to a variety of interfaces such as graphics control, video interface, input interface, output interface, and storage interface, and network interface, and these interfaces in turn are coupled to the appropriate devices. In certain embodiment, Controller 704 may connected to an input structure 714 and display 716 may be provided together, such an in the case of a touch-screen where a touch sensitive mechanism is provided in conjunction with the display 716. In such embodiments, the user may select or interact with displayed interface elements via the touch sensitive mechanism. In this way, the displayed interface may provide interactive functionality, allowing a user to navigate the displayed interface by touching the display 716.

Electric signals (e.g., analog) may be produced by microphone 710 and fed to earpiece 712. Controller 704 may receive instruction signals from input structure 714 and control the operation of display 716. By way of example, display 716 may incorporate liquid crystal display (LCD), light emitting diode (LED), Interferometric modulator display (IMOD), or any other suitable display technology. Audio signals may be transmitted and received by means of an antenna 718 that may be connected through a radio interface 720 or audio input interface such as microphone 724 to codec 722 configured to process signals under control of controller 704. Additionally, multipoint sensing devices may be powered power source 732.

Mobile device may also include one or more user input devices 734 (other than input structure 714) that are operatively coupled to the controller 704. Generally, input devices 734 are configured to transfer data, commands and responses from the outside world into multipoint sensing devices. By way of example, mobile device may include a keyboard or mouse. Input devices 734 may also include one or more hard buttons.

Display device 716 is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display 716 in order to initiate functions and tasks associated therewith.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 602, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   by a computing device, determining a geographical location of the computing device of a user;
   by the computing device, storing, in a location database, a check-in at the geographical location;
   by the computing device, accessing a social-networking news feed comprising a plurality of social-networking news feed items, wherein a first news feed item of the plurality of news feed items comprises a first text corresponding to content of the first news feed item and one or more first media objects, wherein a second news feed item of the plurality of news feed items comprises a second text corresponding to content of the second news feed item and one or more second media objects, wherein at least one of the social-networking news feed items is selected based on the check-in at the geographical location;
   by the computing device, providing a modified version of the social-networking news feed in a first portion of a display and one or more a media wheel frame for displaying media objects extracted from the social-networking news feed in a second and separate portion of the display that is adjacent to the first portion of the display, wherein:
      the modified version of the news feed in the first portion of the display (1) comprises the first text of the first news feed item and the second text of the second news feed item, and (2) omits the one or more first media objects extracted from the first news feed item and the one or more second media objects extracted from the second news feed item,
      the media wheel frame comprises the one or more first media objects extracted from the first news feed item and the one or more second media objects extracted from the second news feed item,
      the first portion of the display is scrollable independently of the media wheel frame,
      the media wheel frame is scrollable independently of the first portion of the display, and
      at least one of the media objects provided for display in the media wheel frame is an activatable element that, when activated, causes the computing device to replace the modified version of the news feed in the first portion of the display with a display of a text and a media object of a social-networking news feed item associated with the activatable element, the media object being displayed in a larger size than the activatable element;
   by the computing device, storing the extracted media objects in a local storage of the computing device;
   by the computing device, periodically updating the extracted media objects stored in the local storage based on information from a remote data store; and
   by the computing device, dynamically updating the media wheel frame based on the updated extracted media objects.

2. The method of claim 1, wherein the selected social-networking news feed item comprises a text comprising information of the geographical location of the user and a media object of the geographical location.

3. The method of claim 1, wherein the selected news feed item comprises an activity captured by a social-networking system.

4. The method of claim 1, wherein each of the media objects in the media wheel frame is selectable.

5. The method of claim 1, wherein the one or more first media objects are uploaded by another user that is socially connected to the user.

6. A system comprising:
   one or more processors; and
   a memory coupled to the processors comprising instructions executable by the processors, the processors being operable when executing the instructions to:
      determine a geographical location of the system of a user;
      store, in a location database, a check-in at the geographical location;
      access a social-networking news feed comprising a plurality of social-networking news feed items, wherein a first news feed item of the plurality of news feed items comprises a first text corresponding to content of the first news feed item and one or more first media objects, wherein a second news feed item of the plurality of news feed items comprises a second text corresponding to content of the second news feed item and one or more second media objects, wherein at least one of the social-networking news feed items is selected based on the check-in at the geographical location;
      provide a modified version of the social-networking news feed in a first portion of a display and a media wheel frame for displaying media objects extracted from the social-networking news feed in a second and separate portion of the display that is adjacent to the first portion of the display, wherein:
         the modified version of the news feed in the first portion of the display (1) comprises the first text of the first news feed item and the second text of the second news feed item, and (2) omits the one or more first media objects extracted from the first news feed item and the one or more second media objects extracted from the second news feed item,
         the media wheel frame comprises the one or more first media objects extracted from the first news feed item and the one or more second media objects extracted from the second news feed item,
         the first portion of the display is scrollable independently of the media wheel frame,
         the media wheel frame is scrollable independently of the first portion of the display, and at least one of the media objects provided for display in the media wheel frame is an activatable element that, when activated, causes the system to replace the modified version of the news feed in the first portion of the display with a display of a text and a media object of a social-networking news feed item associated with the activatable element, the media object being displayed in a larger size than the activatable element;

store the extracted media objects in a local storage;

periodically update the extracted media objects stored in the local storage based on information from a remote data store; and dynamically updating the media wheel frame based on the updated extracted media objects.

7. The system of claim 6, wherein the selected social-networking news feed item comprises a text comprising information of the geographical location of the user and a media object of the geographical location.

8. The system of claim 6, wherein the selected news feed item comprises an activity captured by a social-networking system.

9. The system of claim 6, wherein each of the media objects in the media wheel frame is selectable.

10. The system of claim 6, wherein the one or more first media objects are uploaded by another user that is socially connected to the user.

11. One or more computer-readable non-transitory storage media embodying software that is operable when executed by a processor to:

determine a geographical location of a computing device of a user;

store, in a location database, a check-in at the geographical location;

access a social-networking news feed comprising a plurality of social-networking news feed items, wherein a first news feed item of the plurality of news feed items comprises a first text corresponding to content of the first news feed item and one or more first media objects, wherein a second news feed item of the plurality of news feed items comprises a second text corresponding to content of the second news feed item and one or more second media objects, wherein at least one of the social-networking news feed items is selected based on the check-in at the geographical location provide a modified version of the social-networking news feed in a first portion of a display and a media wheel frame for displaying media objects extracted from the social-networking news feed in a second and separate portion of the display that is adjacent to the first portion of the display, wherein:

the modified version of the news feed in the first portion of the display (1) comprises the first text of the first news feed item and the second text of the second news feed item, and (2) omits the one or more first media objects extracted from the first news feed item and the one or more second media objects extracted from the second news feed item, the media wheel frame comprises the one or more first media objects extracted from the first news feed item and the one or more second media objects extracted from the second news feed item, the first portion of the display is scrollable independently of the media wheel frame, the media wheel frame is scrollable independently of the first portion of the display, and at least one of the media objects provided for display in the media wheel frame is an activatable element that, when activated, causes the computing device to replace the modified version of the news feed in the first portion of the display with a display of a text and a media object of a social-networking news feed item associated with the activatable element, the media object being displayed in a larger size than the activatable element;

store the extracted media objects in a local storage of the computing device;

periodically update the extracted media objects stored in the local storage based on information from a remote data store; and dynamically updating the media wheel frame based on the updated extracted media objects.

12. The media of claim 11, wherein the selected social-networking news feed item comprises a text comprising information of the geographical location of the user and a media object of the geographical location.

13. The media of claim 11, wherein the selected news feed item comprises an activity captured by a social-networking system.

14. The media of claim 11, wherein each of the media objects in the media wheel frame is selectable.

15. The media of claim 11, wherein the one or more first media objects are uploaded by another user that is socially connected to the user.

* * * * *